United States Patent
Schmidt et al.

(10) Patent No.: US 6,727,674 B2
(45) Date of Patent: Apr. 27, 2004

(54) DEVICE FOR PRODUCING OR CONTROLLING AN ALTERNATING CURRENT IN AT LEAST ONE INDUCTIVE LOAD

(75) Inventors: Ulrich Schmidt, Preetz (DE); Jörg Zessin, Ascheberg (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/207,523

(22) Filed: Jul. 29, 2002

(65) Prior Publication Data

US 2003/0025474 A1 Feb. 6, 2003

(30) Foreign Application Priority Data

Aug. 4, 2001 (DE) .......................................... 101 38 502
Nov. 19, 2001 (DE) .......................................... 101 56 779

(51) Int. Cl.$^7$ .............................................. G05B 19/40
(52) U.S. Cl. ....................... 318/685; 318/696; 318/599; 318/811
(58) Field of Search ................................ 318/599, 685, 318/696, 811

(56) References Cited

U.S. PATENT DOCUMENTS

| | | | | | |
|---|---|---|---|---|---|
| 4,438,380 A | * | 3/1984 | Kaseta | ........................ | 318/696 |
| 4,788,484 A | * | 11/1988 | Bolash et al. | ................ | 318/696 |
| 4,829,222 A | * | 5/1989 | Hallenbeck et al. | ........ | 318/696 |
| 5,034,674 A | * | 7/1991 | Sato | ............................ | 318/696 |
| 5,530,332 A | * | 6/1996 | Rees | ............................ | 318/685 |
| 5,656,910 A | | 8/1997 | Erckert | ........................ | 318/685 |
| 5,821,722 A | * | 10/1998 | Forbes et al. | ................ | 318/696 |
| 5,977,737 A | * | 11/1999 | Labriola, II | .................. | 318/599 |
| 5,998,955 A | * | 12/1999 | Nishioka | ...................... | 318/696 |
| 6,114,826 A | * | 9/2000 | Nishiura et al. | ............. | 318/685 |
| 6,198,241 B1 | | 3/2001 | Calamatas | ................... | 318/434 |
| 6,316,902 B1 | * | 11/2001 | Kitamura | ..................... | 318/671 |

FOREIGN PATENT DOCUMENTS

| | | | | |
|---|---|---|---|---|
| DE | 43 39 553 C1 | 6/1995 | ............. | H02P/8/00 |
| EP | 0 460 776 A1 | 4/1991 | ............. | H02P/8/00 |

OTHER PUBLICATIONS

Robert J. Heath, et al., "Development, Application, and Verification of a Digital Model of the 3–Phase Current Regulator Function of a Switched Reluctance Cycloconverter Controller", *Proceedings of the 2000 IEEE*, pp. 908–913, (Sep. 25–27, 2000).

* cited by examiner

*Primary Examiner*—Rina Duda
(74) *Attorney, Agent, or Firm*—Lawrence P. Kessler

(57) ABSTRACT

A device for producing and controlling an alternating current with a direct current source in at least one inductive load, in particular for driving a stepper motor, preferably in microsteps. A device for producing and controlling an alternative current with a direct current source in at least one inductive load, in particular for driving a stepper motor, preferably in micro-steps. Such device includes a control loop circuit having an actuator for the control loop containing a complex programmable logic device (CPLD), which is for connecting the control boy to feedback elements. This provides for a flexible adjustment of the current producing and controlling device to the load to be operated, and to the function of the load, without changing the control loop circuit in which the CPLD is implemented. The actuator can be parameterized by use of a (universal) logic description by parameter constants.

8 Claims, 6 Drawing Sheets

DEVICE FOR PRODUCING OR CONTROLLING AN ALTERNATING CURRENT IN AT LEAST ONE INDUCTIVE LOAD

FIELD OF THE INVENTION

The invention relates to a device for producing an alternating current with a direct current source in at least one inductive load, in particular for driving a stepper motor, preferably in microsteps, and for controlling a direct current in at least one inductive load.

BACKGROUND OF THE INVENTION

Devices for producing an alternating current with a direct current source are known. An important range of application for such devices is, for example, in digital, particularly electrophotographically operating printing presses. Several stepper motors with different functions can be found in such a printing press. These stepper motors must in part provide vastly different torques for their respective functions, such as a torque of approximately 0.15 N m, or a torque of approximately 3.8 N m, depending on their application. Stepper motors with these types of different torques must be controlled differently. For example, with a control of pulse-width modulation (PWM), a high basic frequency is required for the PWM, since at least one PWM pulse must be produced for each microstep. On the other hand, with high inductances, like those that occur during a high torque, operate against the current, meaning that a low frequency is required when such a motor is operating.

In principle, there are two different approaches to the driving of stepper motors, each with a special stepper motor with specific functions, i.e., based on either software or hardware. Software solutions are relatively slow and they have a great deal of difficulty complying with the safety requirements in the area concerned. Hardware solutions based on specific IC's are subject to the prescribed specifications of the manufacturer, so that they are necessarily specified and parameterized for the respective application. Both types of solutions are costly, especially since, as mentioned, even in a single printing press, for example, numerous stepper motors with different special functions can be found.

SUMMARY OF THE INVENTION

The purpose of this invention is to provide devices, which make it possible to take into account the targeted operating conditions of stepper motors in a cost-effective and reliable manner. According to the invention, this purpose is provided by a control loop and an actuator for the control loop, which contain a device for a complex programmable logic (CPLD; complex programmable logic device). This makes it possible, by simply reprogramming the logic, to advantageously provide a flexible adjustment to the control of the load to be operated and to the function of the load without changing the circuit in which the IC is implemented. The invention thus combines the advantages of software and hardware in a certain manner and prevents their disadvantages at the same time. In particular, the logic, once programmed, is as good as a hard-wired hardware and guarantees its operating reliability, but the logic is, on the other hand, simply reprogrammable for other operating conditions.

The solution according to the invention is also cost effective with respect to its purchase and maintenance. For example, in a single printing press the implemented stepper motors and the associated controls can be substantially standardized. This is readily accomplished by the independent solution of the task at hand, whereby a device according to the invention for controlling a direct current in at least one inductive load is distinguished by a loop and an actuator, which is parameterized or may be parameterized with the application of a (universal) logic description with parametric constants. The term "logic description" as used herein, and understood by one of ordinary skill in the art, refers to the description of the implemented logic in a CPLD. A CPLD has a programmable logic that can be described, for example, by a flow chart. In this way, the logic description (description of the implemented logic) is readily apparent. The logic circuit can be parameterized in such a way that it is only necessary to change parameters to chance (customize) the logic circuit. The logic circuit is then like an unchangeable frame which can be filled and customized for respective purposes by choosing appropriate parameter values for the parameters given by the logic. The logic description can also be universal in the sense that it is essentially standardized and accordingly prepared for the respective function and condition only by feeding the respective parameter constants. Thus the invention already contains a spreading advantage in the parameterization itself, whereby characteristics of the respective special control are concentrated or manifested and reproduced in such parameters.

The control itself takes place preferably via a pulse-width modulation, as has already been mentioned, particularly for a two-phase control with microsteps. The preferred parameters and parameterizations permit an adaptation of the control to the requirements. As has already been mentioned, low frequencies are required with high inductances, although the pulse-width modulation itself requires a relatively high frequency. The basic frequency of the pulse-width modulation can thus preferably be set according to the invention by a parameter constant especially designated for this purpose, designated in form of an abbreviation as "f_chop_cnt (frequency chopping constant)".

When a high precision for the current in the inductance is required, the minimal on-period must be as short as possible. However, the characteristics of high inductances are inconsistent with a short minimal on-period. This minimal on-period can thus also be set preferably by a parameter constant, designated as "Min_on_cnt (Minimal on-period constant)". The minimal total break period can likewise preferably be set with a parameter constant, designated "Min_off_cnt (Minimal off-period constant)". The signal traveling time in the feedback path of the loop is not negligible with high frequencies, causing a time lag in the loop, which must be compensated for the operation of the PWM control at high frequencies. Thus, according to the invention, the time lag in the loop and/or the duration of the time lag can preferably and respectively be set via parameter constants, designated as "Comp_dis_del_cnt (Compensation disable delay constant)" and "Comp_dis_len_cnt (Compensation disable length constant)".

The device according to the invention controls, as an example, the current in both motor windings of a 2-phase stepper motor. To this end, the necessary output signals for controlling an H-bridge driver are provided, so that either an integrated H-bridge can be used, or for very high currents, a bridge consisting of discreet transistors with the corresponding driver can be used.

The invention, and its objects and advantages, will become more apparent in the detailed description of the preferred embodiment presented below.

BRIEF DESCRIPTION OF THE DRAWINGS

Embodiments that also provide further inventive characteristics, to which the scope of the invention is, however, not limited, are shown in the drawings. The following are schematically illustrated.

DETAILED DESCRIPTION OF THE INVENTION

Figure 1:
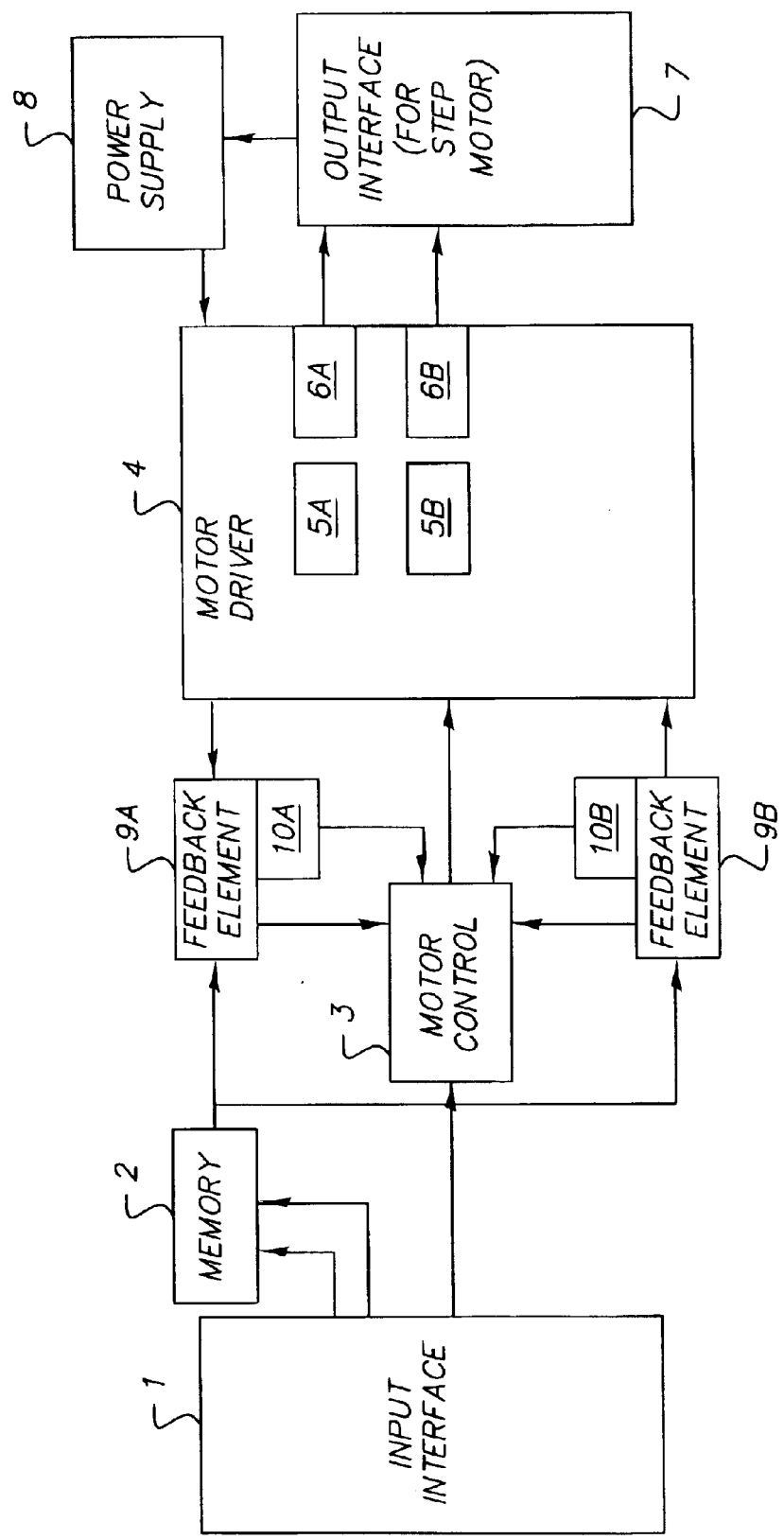
FIG. 1 is a block diagram of a motor-driving circuit for a 2-phase stepper motor.

FIG. 1 shows a block diagram of a motor-driving circuit for a 2-phase stepper motor. The schematically illustrated circuit controls the current of both the motor windings of a 2-phase stepper motor. The motor-driving circuit has an input interface 1. This is connected with a reference memory 2, in which the input interface 1 stores addresses and other data, and with a motor control device 3, which contains in particular the complex programmable logic device according to the invention.

A motor driver 4 is attached to the motor controlling device 3. The motor driver 4 contains an H-bridge driver 5A and 5B and H-bridges 6A and 6B for driving both phase 1 and phase 2 or A and B of a stepper motor. With its output signals, the motor driver 4 controls the stepper motor (which is not shown in greater detail) via an output interface 7, which emits signals to a power supply device 8 for the stepper motor. For its part, the power supply device 8 is also directly connected with the motor driver 4. The motor driver 4 is in turn connected via feedback elements 9A and 9B and via short circuit branches 10A and 10B to the motor controlling device, as a result of which corresponding control loops are formed.

Figure 2:
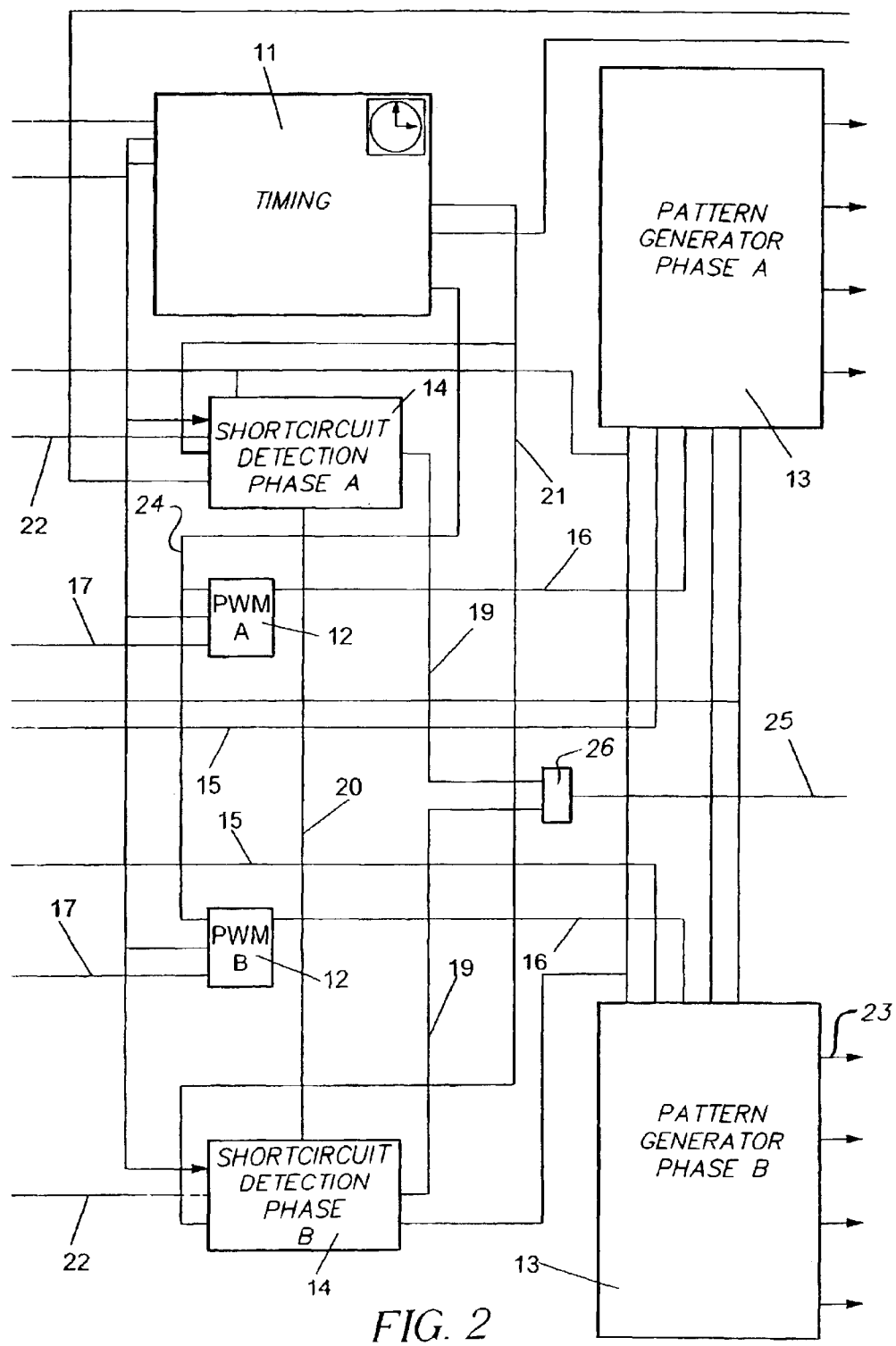
FIG. 2 is an actuator of a motor-driving circuit according to the invention represented in FIG. 1 as a block diagram.

FIG. 2 is explanatory with the help of the abbreviations used and words, and the same also applies to the following figures. Consequently, only a few of the illustrated elements are discussed below. Additional conditions can be deduced from the figures. FIG. 2 explains the function of a programmable logic device used as an actuator of a control loop for controlling a 2-phase stepper motor. For this purpose, this actuator contains in particular a timing block 11, pulse-width modulators (PWM) 12 for the respective phases A and B, phase pattern generators 13 for phase A and B and short-circuit detectors 14 for phases A and B. These blocks 11 through 14 are also represented as block diagrams in the following FIGS. 3 through 6, but with somewhat greater detail of their content.

The driving signals 23 for the motor windings of the stepper motor are finally provided by the respective phase pattern generator 13. For this reason, the respective actual phase signal of the phase 1 or 2 and A or B is first input via lines 15 in the respective phase pattern generator 13. However, modulation signals from the respective pulse-width modulators 12 are also input via lines 16 in the respective phase pattern generator 13. However, the pulse-width modulators 12 are located in a respective control loop and receive signals from the feedback elements 9A and 9B via lines 17. Furthermore, the pulse-width modulators 12 are also connected to the timing block 11 via lines 24, which controls them with its time signals and thus the pulse-width modulation decidedly influences and predetermines the respective requirements, conditions and functions of the respective stepper motor.

It can be deduced from FIG. 2 that the short-circuit loops are available via short-circuit detectors 14 for phase A and B. The short-circuit detectors 14 are linked together by a short-circuit conductor 19, which are summarized to one line 25 via a junction 26, and short-circuit detectors 14 are connected together via a line 20. They are also connected with the timing block 11 via a line 21. They are arranged via lines 22 on the input side in the short-circuit branches 10A and 10B. There are further lines, which can be seen from FIG. 2, i.e., line 27 for a reference-load signal "ref_load", a line 28 for a signal "load DAC", a line 29 for a clock signal "clk", a line 30 for a signal "Comp disable", explained with FIG. 3, a line 31 for an enabling signal "ena" and a line 32 for a signal "Power on reset".

Figure 3:
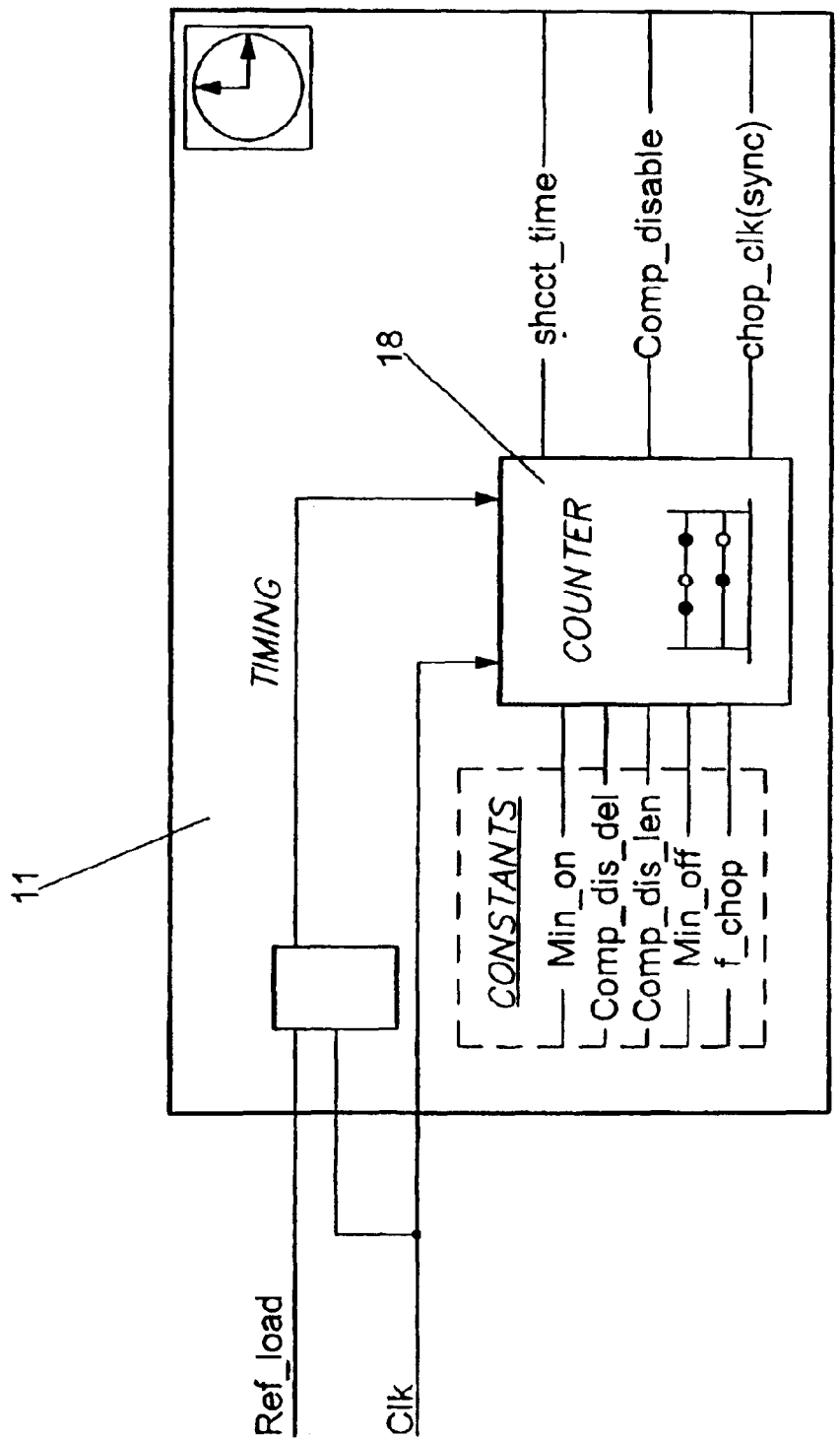
FIG. 3 is a device for timing of the actuator represented in FIG. 1 as a block diagram.

As can be seen in FIG. 3, in which the timing block 11 is illustrated in greater detail, the timing block 11 includes a counter 18 for its time signal, which can be programmed for the respective application according to the invention by the parameter constants input in the timing block 11, abbreviated as "Min_on", "Comp_dis_del", "Comp_dis_len", "Min_off" and "f_chop", but being the same constants as mentioned before with their whole names. The counter 18 is directly fed with a clock signal "clk" via the line 29. A reference-load signal "Ref_load" is conducted in the Counter 18 via the line 27 and via a D-flip flop 33 (the D-input of the D-flip flop 33), whereby the clock signal "clk" is transmitted to a clear- or preset-input of the D-flip flop 33 via line 34 and the output-signal of the flip flop 33 is conducted from the output Q via a line 40 to an input of the counter 18. The output signals of the timing block 11 are the output signals of the Counter 18 and these are a short circuit time signal "sheet_time" on line 21, the Compensation disable signal "Comp_disable" on line 30, which compensates the idle time by using the Compensation disable delay constant "Comp_dis_del(-cnt)" and the Compensation disable length constant "Comp_dis_len(-cnt)", and a chopped clock signal (synchronized) "chop_clk (sync)" on line 24. The further conducting of these output signals can be seen from and has been explained with FIG. 2.

Figure 4:
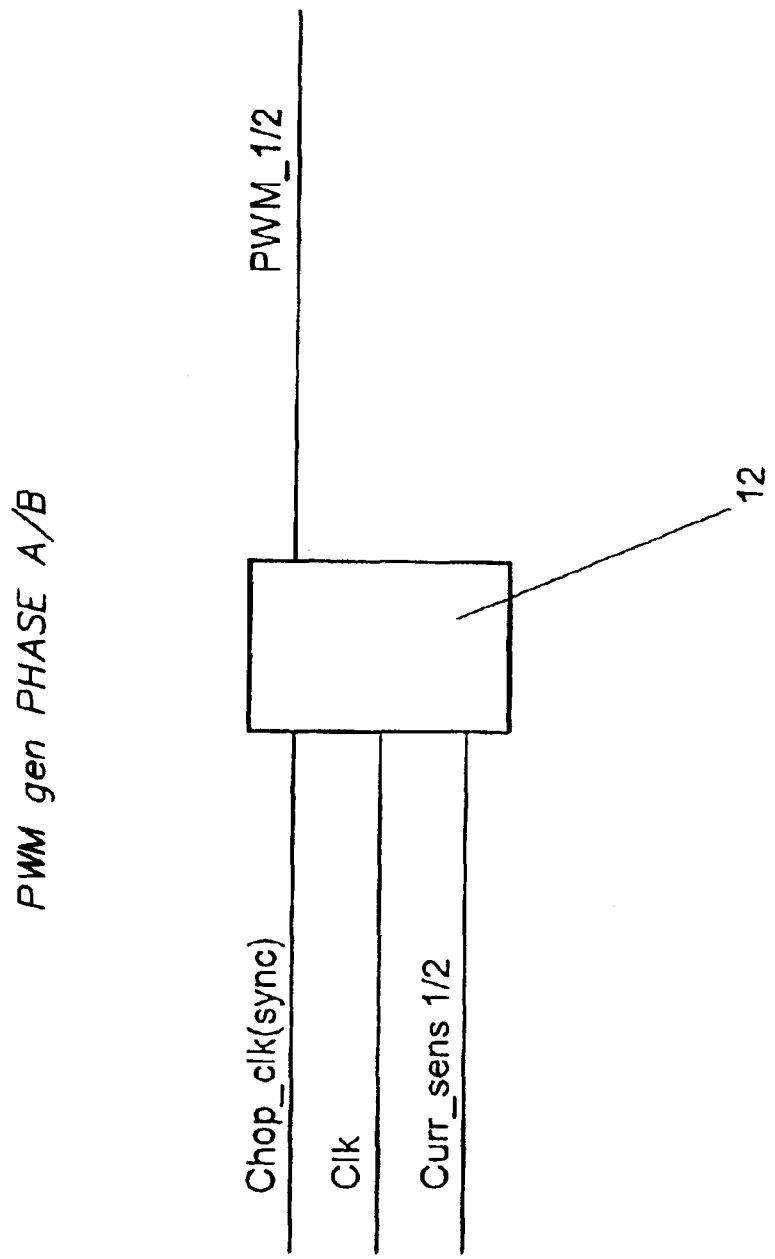
FIG. 4 is a device for the pulse-width modulation of the actuator represented in FIG. 2 as a block diagram.
Figure 5:
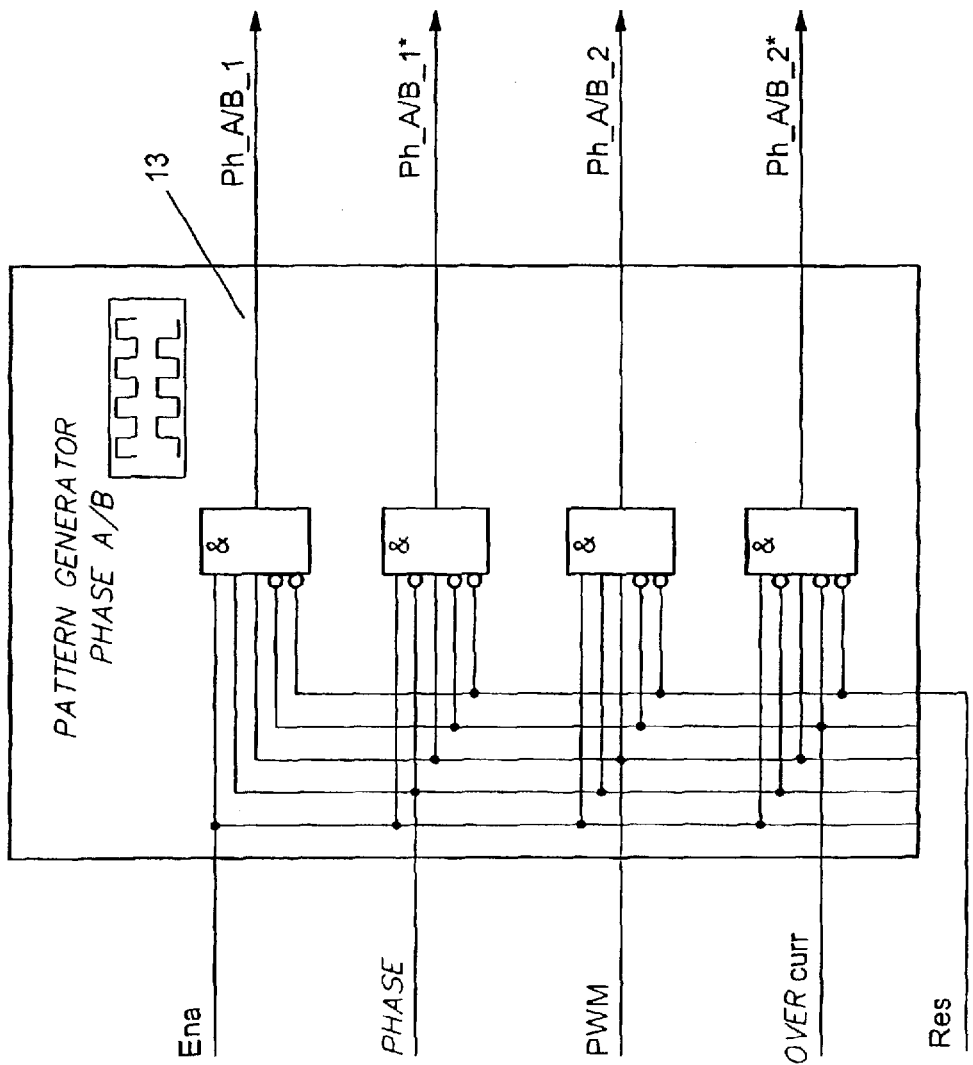
FIG. 5 is a phase pattern generator of an actuator represented in FIG. 2 as a block diagram.
Figure 6:
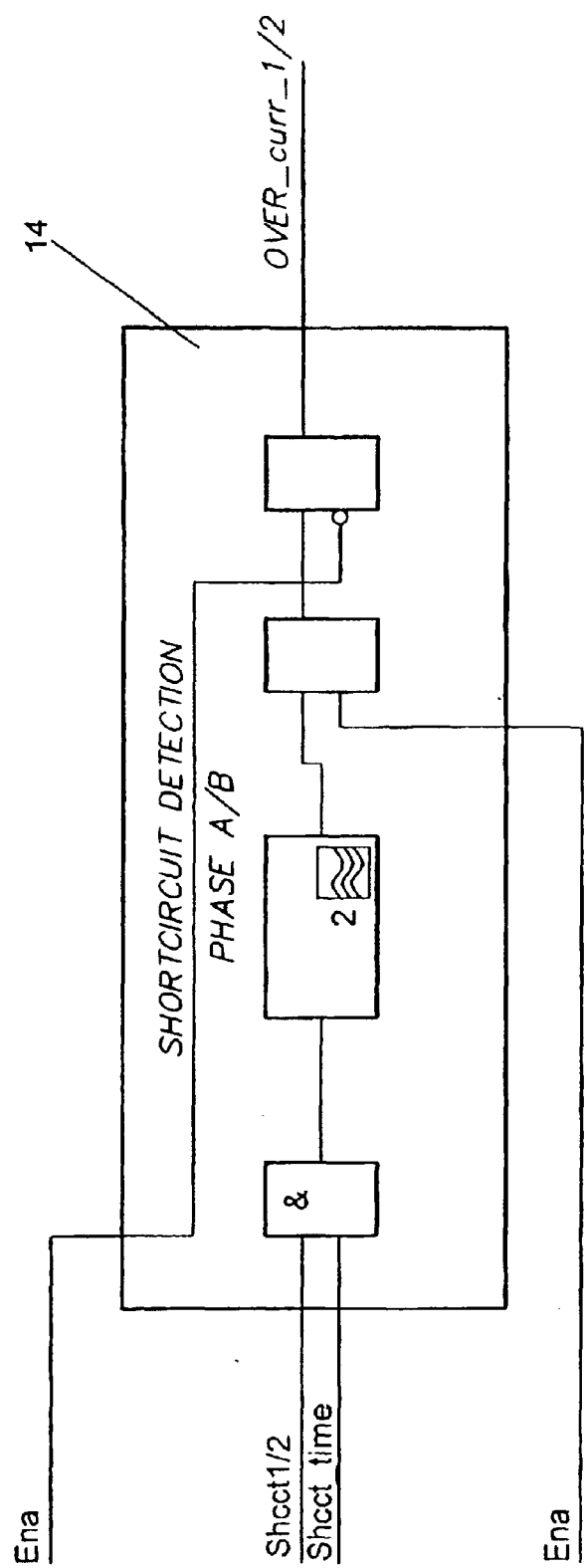
FIG. 6 is a short-circuit detector of an actuator represented in FIG. 2 as a block diagram.

The FIGS. 4 through 6 show a pulse-width modulator 12, a phase model generator 13 and a short-circuit detector 14 in greater detail and they are, as mentioned, self-explanatory for further details, if or as far as not expressively explained in the following. The FIG. 4 shows a pulse-width modulator "PWM" 12 which generates the pulses "PWM_½" or signals for phases A and B for an input in the Pattern generator Phase A/B 13 via lines 16. The pulse-width modulators for Phases A and B are substantially the same. They respectively include a RS-flip flop (Set-reset flip flop) in the box 12. The RS-flip flop receives in its input S via line 24 the "Chop_clk(sync)" signal from the counter 18, in its clear- or preset-input C via line 29 a clock signal "clk" and in its input R signals "Curr_sens ½" from the feedback elements 9A and 9B via lines 17. The flip flop has an output Q.

The FIG. 5 shows a Pattern generator Phase A/B 13, having four NAND-elements 35 with the phase signals "Ph_A/B_1", "Ph_A/B_1*", "Ph_A/B_2" and "Ph_A/B_2*" as their output-signals for controlling the 2-phase stepper motor via lines 23. The input-signals for the four NAND-elements 35 are the enable signal "Ena" via line 31, a phase signal via line 15, the output-signal "PWM" from a pulse-width modulator 12 via line 16, an over current signal "Over curr" via line 25 and a reset signal "Res" via line 32, which can also seen from FIG. 2. The FIG. 6 shows a short-cut detector14, having an AND-element 36, a filter 37 and two RS-flip flops 38, 39 (with inputs S and R and outputs Q). The output-signal is a "Over_curr_½"-signal on a line 19. As input signals the short-cut detector 14 receives a short-cut signal "Sheet ½" via line 22, enable signals "Ena" via line 31 and a short-cut time signal "Sheet_time" via line 29 (resp. via line 20).

The invention has been described in detail with particular reference to certain preferred embodiments thereof, but it will be understood that variations and modifications can be effected within the spirit and scope of the invention.

What is claimed is:

1. A device for producing and controlling an alternating current with a direct current source in at least one inductive load, in particular for driving a stepper motor, preferably in micro-steps, comprising:

a control loop circuit having an actuator for said control loop, said actuator containing a complex programmable logic device said complex programmable logic device connecting said control loop circuit to feedback elements so as to provide for a flexible adjustment of the current producing and controlling device to the load to be operated, and to the function of the load, without changing the control loop circuit in which said complex programmable logic device is implemented, operative to generate alternating phases in said load in response to at least one parameter relative to desired current within said load, said at least one parameter being selected by applying a (universal) logic description to provide said parameter as a series of parameter constants.

2. The device to claim 1, wherein said parameter constants are used to program a pulse width modulation circuit.

3. The device according to claim 2, wherein said parameter constants further comprise a basic frequency for said pulse width modulation circuit.

4. The device according to claim 2, wherein said parameter constants further comprise a setting for the minimal on-period of said pulse modulation circuit.

5. The device according to claim 2, wherein said parameter constants further comprise a setting for the minimal total break period.

6. The device according to claim 2, wherein said parameter constants further comprise a setting for the time lag in said control loop.

7. The device according to claim 1, further comprising an H-bridge driver with at least one H-bridge.

8. The device according to claim 7, wherein said bridge driver further comprises a plurality transistors with a corresponding H-driver.

* * * * *